Inventor
Asher D. Armstrong,
By his Attorneys

March 25, 1941.  A. D. ARMSTRONG  2,236,359
AUTOMATIC HUMIDIFIER
Filed June 6, 1940  2 Sheets-Sheet 2
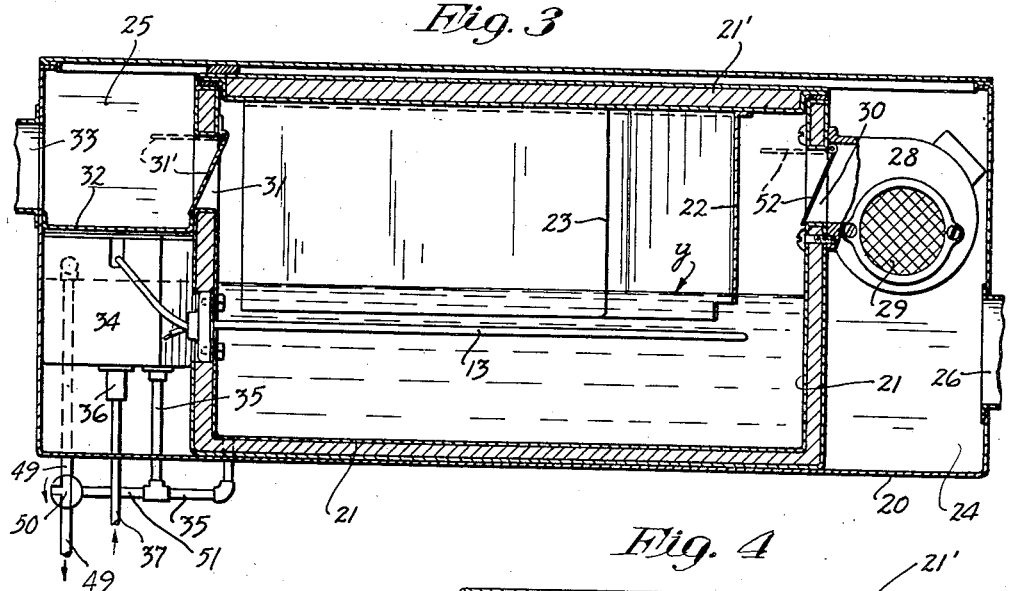
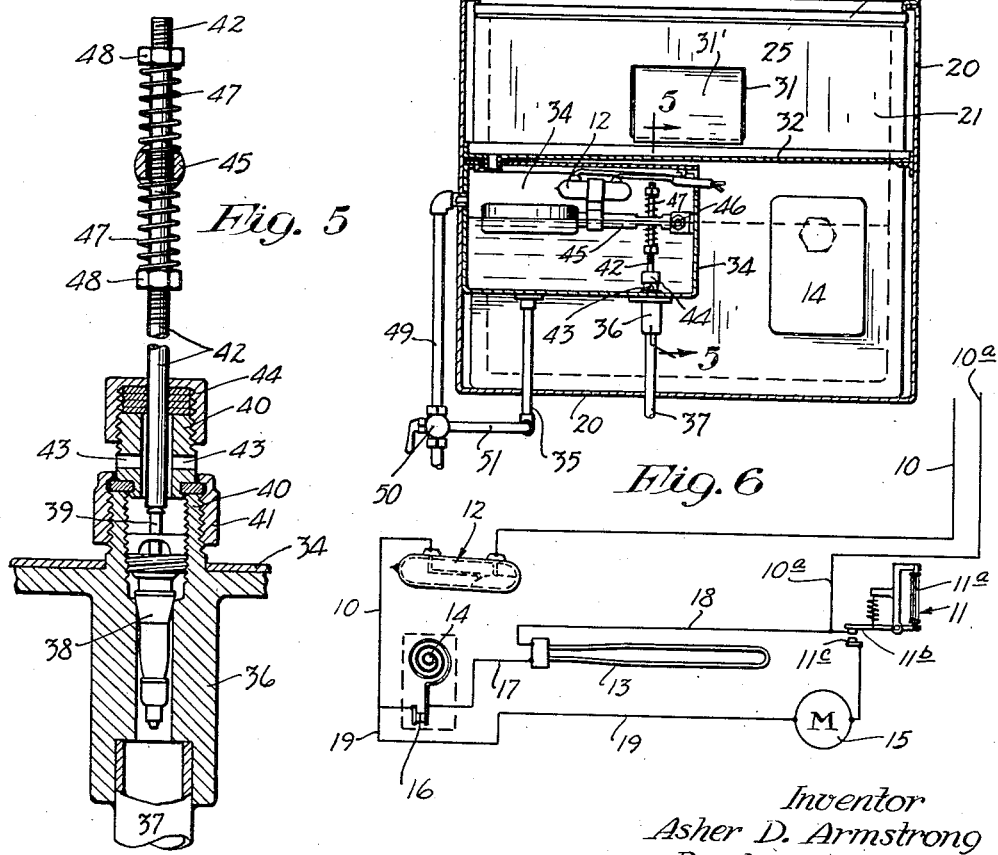
Inventor
Asher D. Armstrong
By his Attorneys Patented Mar. 25, 1941

2,236,359

UNITED STATES PATENT OFFICE 2,236,359

AUTOMATIC HUMIDIFIER

Asher D. Armstrong, New Richmond, Wis.

Application June 6, 1940, Serial No. 339,130

11 Claims. (Cl. 261—39)

My invention provides an extremely simple and highly efficient automatic humidifier, the accomplished purpose of which is to automatically control and maintain uniform humidity in a room, apartment, or other enclosures in which people live or work; generally stated, the invention consists of the novel devices, combination of devices, and relative arrangement of parts hereinafter disclosed and defined in the claims.

The improved device or apparatus involves a water containing vapor tank, which is preferably located outside of and more or less remote from the room or enclosure of which the humidity is to be regulated. This vaporizing tank or receptacle has a vapor delivery conduit leading to the room or enclosure in which the humidity is to be regulated, and preferably air forcing means such as a motor operated fan or blower will be employed to produce a forced flow or circulation of humidified air.

The master controller of the system is a humidostat located in the room or enclosure, the humidity of which is to be regulated, and here it may be stated that the term "humidostat" is used in a broad sense to include any of the well known commercial forms or other suitable instruments that are sensitive to varying humidity and will, for example, control an electric circuit.

For maintaining the proper vaporizing temperature of the water in the supply tank, I preferably employ an electric heating element in conjunction with a thermostat that is applied in such a way that it is subject to the temperature of the water in the supply tank and hence is of such character and operates in such a way that it may be designated as an "aquastat."

As a further highly important element, I employ means for maintaining a substantially constant level of water in the supply tank and utilize this level controlling element to operate a cut-out-and-cut-in switch, combination with electric connections arranged in such a way that the master controller or humidostat, the electrical heat controlling thermostat or aquastat, and the motor actuated fan or blower will function only when the water level in the water supply tank is approximately in the maximum altitude.

In the accompanying drawings, like characters indicate like parts throughout the several views.

Referring to the drawings:

Fig. 3 is a vertical section taken approximately on the line 3—3 of Fig. 1;

Fig. 4 is a transverse vertical section taken approximately on the line 4—4 of Fig. 1;

Fig. 5 is an axial section of the water intake valve mechanism; and

Fig. 6 is a diagrammatic view illustrating the relation of the electrical and electromagnetic elements of the apparatus.

Figure 1:
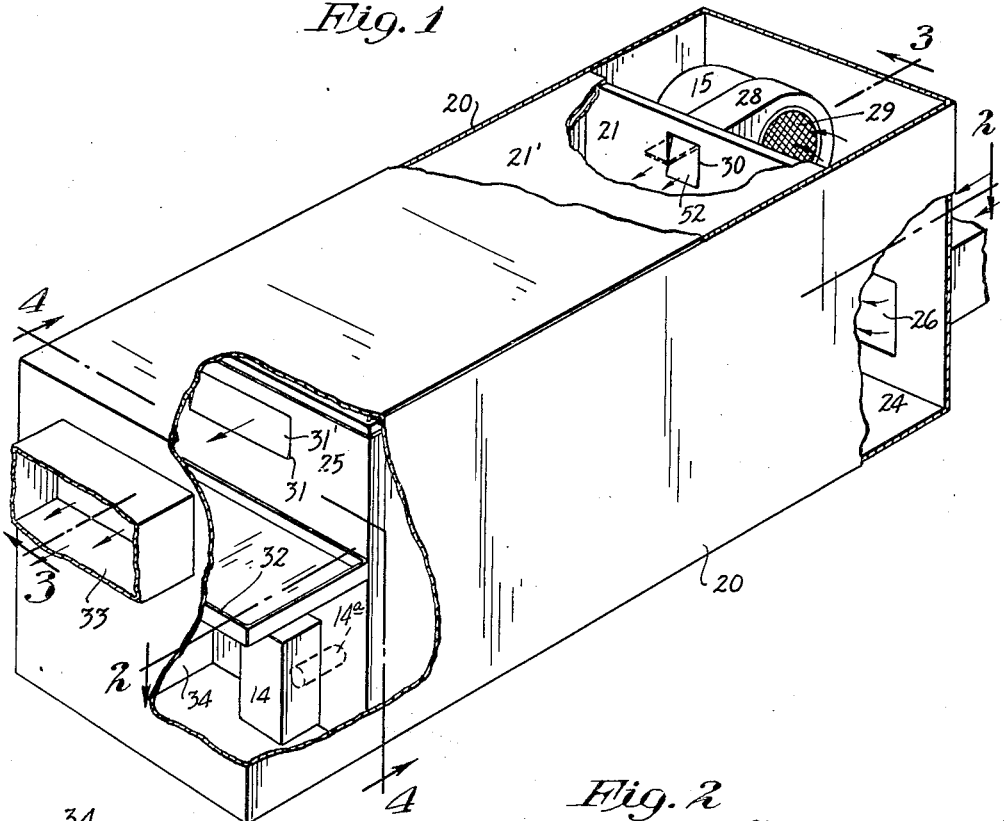
Fig. 1 is a view in perspective showing the casing or housing and enclosed parts of the improved apparatus.
Figure 2:
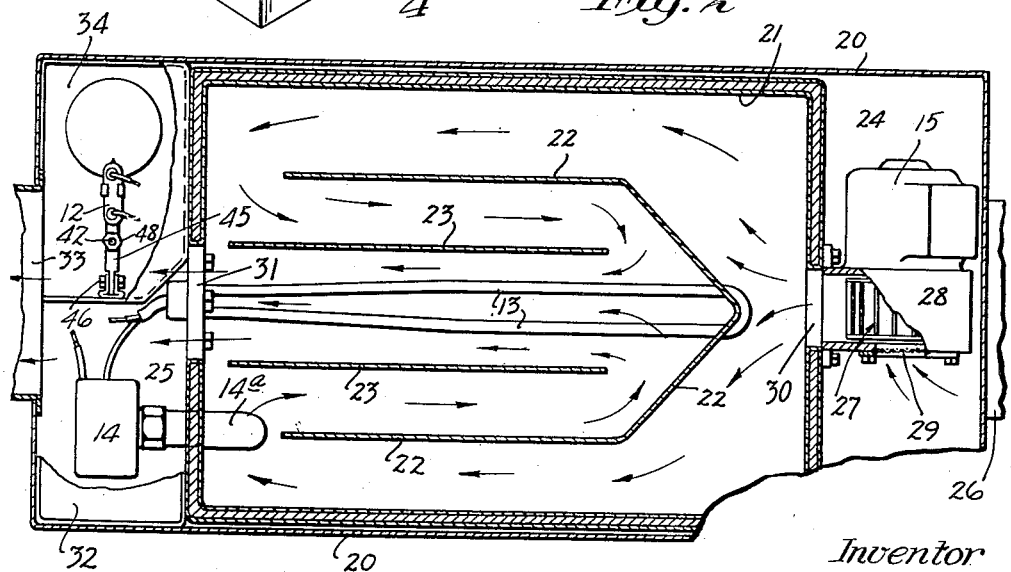
Fig. 2 is a horizontal section taken approximately on the line 2—2 of Fig. 1.

Before describing the mechanism or elements within the casing or housing of the apparatus, attention is called particularly to the diagrammatic view Fig. 6, and the elements of which will be briefly described as follows:

Numerals 10 and 10a indicate lead or supply wires that lead from a suitable source of supply not shown. The numeral 11 indicates as an entirety the humidostat. The numeral 12 indicates an electric switch conventionally shown as of the mercury bulb type, which as shown is interposed in the lead 10. The numeral 13 indicates an electrical heating element, and the numeral 14 indicates a thermostat, and the numeral 15 indicates an electric motor for operating a fan or blower. The humidostat may be of any commercial or suitable type, but as shown it is of a type involving a moisture sensitive element 11a that operates the movable lever or element 11b of an electrical switch but involves also a fixed contact 11c.

For the present, it is only necessary to note that when the mercury bulb is rocked as shown in Fig. 6 the circuit will be closed, but when rocked to the reverse angle, the circuit will be opened so far as the bulb is concerned. The thermostat 14, which as previously stated, and as will hereinafter be more fully described, operates as an aquastat, controlling a switch 16 interposed in a wire or branch lead 17, and is connected to one side of the electrical heating element 13. The other side of said electrical heating element, by wire 18, is connected to the main lead 10a, and to the movable contact 11b of the master switch actuated by the thermostat.

Wire 19 connects the extended portion of the lead 10 to the fixed contact 11c through the electric motor 15.

As already indicated, the humidostat 11 will be located in the room, the humidity of which is to be regulated. Under high humidity, the master switch 10b—10c will be opened, and under low humidity the said switch will be closed. Standard humidostats are provided with adjusting means whereby they can be set closed and open by the control switch at predetermined desired humidity or humidities. Also the commercial thermostats diagrammatically indicated at 14, such as found on the market, have means for adjustment so that the switch 16 can be opened and closed at desired temperatures. The fan or blower may take various forms but, as shown, and preferably, is of the type well-known to the trade as a "sirocco" fan.

At this time it is not only desirable to note that when the circuit is broken by rocking of the mercury bulb 12, it will then be impossible to close either the branch circuit 17—18 through the heating element 13, or to close the motor circuit 19 through master switch 11b—11c. When the circuit is closed, the switch 12, the circuit through the electrical heating element will be closed when and only when the temperature acting upon thermostat 14 falls below a predetermined temperature; and the circuit through motor 15 and master switch 11b—11c can be closed only when the predetermined humidity in the serviced room falls below the predetermined humidity.

With these statements of the general action of the electrical elements in mind, the various elements shown as within or closely associated with the casing or housing will now be described. The said casing, of course, may take different forms such, as shown, in the form of a rectangular sheet metal structure 20 within which is a water containing vapor generating box or inner housing 21, which latter preferably has insulated walls, bottom and top. Here it will be noted that the above described heating element 13 is located within this water containing, vapor generating chamber or compartment, below the water level thereof and which normal level is indicated by $y$ of Fig. 3. Also within the water compartment 21 are baffles 22 and 23 which cause the air to make a tortuous travel within the vapor chamber.

In the drawings, the vaporizing chamber or compartments 21 are provided with a removable top or cover 21' to which the baffle flanges 22 and 23 are attached with their lower edges extended below the water level $y$.

In this preferred arrangement illustrated, the box-like vaporizing generating chamber 21 is shorter than the casing 20, so as to afford an air intake chamber 24 at one end for an outlet chamber 25 at the other end of the casing. An air intake pipe 26 which extends from any suitable source of air supply, either from outside, or from a return pipe, opens into the compartment 24. Within this compartment 24 is a fan or blower 27 that is driven by the electric motor 15 described in connection with the diagrammatic view 6. This fan 27 is shown as indicated in a fan casing 28 that has an axial air intake 29 and discharge port 30, which latter opens into the chamber 21. At its other end the chamber 21 has an air outlet portion 31 that opens therefrom into chamber or compartment 25.

In the chamber 25 is a horizontal partition or plate 32 that affords a drip pan below the air passage 31. The outer wall of the compartment 25, at a point above the drip pan 32, has an air discharge passage that leads into an air pipe 33 that extends to the room or space, the humidity of which is to be regulated.

Automatic means is provided for maintaining the water level $y$ above indicated and this device includes means for locking the mercury bulb or other switch element. This valve mechanism is preferably a float valve unit contained within a water box 34 located in the compartment 25 below the drip pan 32. To maintain common level within this box 34 and in the vaporizing chamber or compartment 21, the bottoms of said members are connected by a U-shaped pipe 35.

The water intake valve mechanism just referred to may take various forms, but is preferably of the snap-action float valve type which may be and preferably is of the detailed construction best illustrated in Fig. 5, wherein the numeral 36 indicates a valve casing connected by a pipe 37 to a suitable source of water supply under pressure, not shown. This valve casing 36 is secured to and depends from the bottom of the water box 34 and set within the same is an intake valve 38 shown as of the "Dill" or "Schraeder" valve, such as used in pneumatic tires, and which is self-closing but adapted to be opened by a downward pressure on its stem 39.

In the air port 31 is a gravity-closed air pressure opened damper 31'.

Further describing in detail the particular valve mechanism illustrated, it will be noted that the valve seat 36 has a threaded upper end to which is secured a guide plug 40, by means of a nut-acting clamping ring 41. Plug 40 has an axial passage in which works a thrust plunger 42, the lower end of which is engageable with the upper end of the valve stem 39, said plug 40 having one or more axial water discharge passages 43 and at its upper end has a stuffing box 44 through which the plunger 42 works.

This intake valve mechanism is directly controlled by a float-equipped lever 45 located within the water box 34 and pivotally connected to one wall thereof at 46, see particularly Fig. 4. Near its pivot 46 level 45 has a perforation through which valve operating plunger 42 works freely. Opposed coiled springs 47, placed on the plunger 42, are compressed between the lever 45 and nuts 48 adjustably mounted on said plunger. Obviously, with this arrangement when the water in the compartments 21 and 25 falls below a predetermined point, float-equipped lever 45 will lower and press down plunger 42 causing the valve 38 to open for the flow of water into the said compartments. Of course, when lever 45 is raised to the predetermined desired level, valve 38 will automatically close and cut off the further flow of water into the said compartments.

It is now important to note that the mercury bulb 12, the operation of which has been generally outlined, is attached to the float lever 45 so that when the water level is at the desired altitude, said bulb will be brought back to the position shown in Figs. 4 and 6, thereby closing the circuit at the said bulb. When, however, the altitude of the water of the said compartments lowers to any considerable extent, float lever will, under the action of gravity, drop to an inclined position such as will then open the water intake valve and at the same time tilt mercury bulb into a circuit opening position.

The thermostat 14 above described and which, as stated, is here employed as an aquastat, is contained within a metallic housing 14a partly located in the lower portion of the compartment 25 and the sensitive portion of which is extended into the vaporizing compartment 21 and submerged in the water therein contained so that when the water in said vaporizing chamber reaches a certain predetermined desired temperature, switch 16 will be opened, thereby cutting off the supply of current to the electrical heating element 13, but when the temperature of the said water drops materially below the predetermined desired temperature, switch 16 will be closed, thereby causing a supply of current to the element 13 so as to keep up the temperature of the water to a point suitable for rapid vaporization.

An overflow pipe 49 extends from the upper portion of the float chamber or box 34 and mounted therein is a three-way valve 50 (conventionally shown in Fig. 3) and also connected by a pipe 51, to the lower end of the U-shaped pipe 35.

The numeral 52, see Fig. 3, indicates a gravity-closed air pressure opened damper located in the air discharge passage from the fan casing into the vaporizing chamber.

When valve 50 is set, as indicated in Fig. 3, overflow from float box 34 will be opened to drain and the U-shaped pipes 35 will afford communication between the main and auxiliary water compartments, but the pipe 51 will be closed so that the main and auxiliary water compartments will not be drained. When it is desired to drain the main and auxiliary water compartments, valve 50 will be turned 90° in the direction of the arrow marked adjacent thereto on Fig. 3.

*Summary of operation*

The operation of the apparatus described is probably evident from the foregoing description and statements made, but may be briefly summarized as follows:

When the motor-driven fan is in action, air will be blown from the vaporizing unit and delivered to the room or place where the humidostat 11 is located. When the water level in the vaporizing chamber or main water container is up to the predetermined desired level, the cut-in and cut-out switch, represented by the mercury bulb 12, will close the line at that point so that the switch 11b—11c that controls the fan motor circuit or the thermostat 14 that controls the circuit to heater 13 may function under the following conditions: If the temperature of the water in the vaporizing chamber 21 falls below a predetermined desired temperature for which said thermostat 14 is set, then switch 16 will be closed and the current will be delivered to heating element 13 so as to thereby bring up the temperature of the water; and if the humidity in the room where the humidostat 11 is located falls below a predetermined degree of humidity, then humidostat 11 will close switch 11b—11c cutting the fan motor into action.

The above noted temperature-producing and air-circulating actions may take place simultaneously or independently but only when the switch 12 closes the common circuit that includes the supply lead which, in this particular illustration, is the wire 10.

It is thought to be obvious that the above described operations are highly important. For example, the operation of bringing up the water level in the vaporizing tank or compartment will be accomplished in a very few moments and during the time that this is being accomplished, there would be no advantage in forcing the air through the vaporizing chamber and, moreover, there would be no particular advantage in starting up the fan or blower until the temperature of the water in the vaporizing compartment has been brought up to the proper temperature for rapid vaporization. With the arrangement described, when cold or cool water has been added to the water in the vaporizing chamber and the level thereof restored to normal, the first thing that usually will follow will be starting of the heater into action. If at the same time the humidity in the room where the humidostat is located should happen to be low, then thermostat switch 16 will be closed in advance of closing of circuit by switch 12, and under this latter noted condition, both the fan motor and the heat supplying circuit to element 13 will be closed simultaneously as soon as switch 12 has closed the lead 10 under the action of float-equipped lever 45 at the instant that the said lever is raised and the level of the water in the vaporizing chamber has been restored.

I have now described in considerable detail and indicated more or less broadly the novel features of my invention, but it will be understood that various other alterations and changes may be made all within the scope of the invention and within the scope of the appended claims.

The electrical heating element is thought to be decidedly the best form of heating medium, but any other heating element that would function within the combinations claimed would be within the scope of the invention. Also, as indicated, while the float valve is desirable, other means might be utilized to maintain a substantially constant level of water in the vaporizing chamber.

What I claim is:

1. In a humidifying system, an electric circuit involving a common lead and two shunt leads, a cut-out switch in said common lead, a heat controlling element and a switch therefor in one of said shunt leads, a thermostat for opening and closing said heat controlling switch, an electric motor and a motor controlling switch in the other of said shunt leads, a humidostat with connections for opening and closing said motor controlling switch, a water-containing vaporizing chamber having an air intake and an air outlet, the latter extending to the place or space where said humidostat is located, a fan operated by said electric motor and arranged to produce a forced circulation of air through said vaporizing chamber, said thermostat being so located that it is subject to the temperature of the water in said vaporizing chamber.

2. In a humidifying system, an electric circuit involving a common lead and two shunt leads, a cut-out switch in said common lead, a heat controlling element and a switch therefor in one of said shunt leads, a thermostat for opening and closing said heat controlling switch, an electric motor and a motor controlling switch in the other of said shunt leads, a humidostat with connections for opening and closing said motor controlling switch, a water-containing vaporizing chamber having an air intake and an air outlet, the latter extending to the place or space where said humidostat is located, a fan operated by said electric motor and arranged to produce a forced circulation of air through said vaporizing chamber, and means whereby said cut-out switch is actuated by the water level in said vaporizing chamber and will be closed only when the water level is at the desired maximum.

3. In a humidifying system, an electric circuit involving a common lead and two shunt leads, a cut-out switch in said common lead, a heat controlling element and a switch therefor in one of said shunt leads, a thermostat for opening and closing said heat controlling switch, an electric motor and a motor controlling switch in the other of said shunt leads, a humidostat with connections for opening and closing said motor controlling switch, a water-containing vaporizing chamber having an air inlet and an air outlet, the latter extending to the place or space where said humidostat is located, a fan operated by said electric motor and arranged to produce a forced circulation of air through said vaporizing chamber, said thermostat being so located that it is subject to the temperature of the water in said vaporizing chamber, a water supply conduit leading to said vaporizing chamber and provided with a normally closed intake valve, a float subject to the altitude of water in said vaporizing chamber, said float having connections to said cut-out switch and operative to close said cut-out switch when and only when the predetermined altitude of water is maintained in said vaporizing chamber.

4. The structure defined in claim 3 in which said cut-out switch is a mercury bulb arranged to be given oscillatory movements by said cut-out switch actuating mechanism.

5. In a humidifying system, an electric circuit involving a common lead and two shunt leads, a cut-out switch in said common lead, a heat controlling element and a switch therefor in one of said shunt leads, a thermostat for opening and closing said heat controlling switch, an electric motor and a motor controlling switch in the other of said shunt leads, a humidostat with connections for opening and closing said motor controlling switch, a water-containing vaporizing chamber having an air intake and an air outlet, the latter extending to the place or space where said humidostat is located, a fan operated by said electric motor and arranged to produce a forced circulation of air through said vaporizing chamber, a normally closed water supply valve leading to said vaporizing chamber, and a float subject to the water level in said vaporizing chamber having connections for opening and closing said intake valve and for actuating said cut-out switch.

6. The structure defined in claim 1 in which said humidostat is located in an enclosure to be humidified that is remote from said vaporizing chamber and its immediately associated parts.

7. The structure defined in claim 1 in which said vaporizing chamber is provided with an auxiliary chamber located outside thereof but connected thereto for common water level, the means for controlling said cut-out switch and the intake of water to said vaporizing chamber being located in said auxiliary chamber.

8. The structure defined in claim 2 in which said vaporizing chamber is provided with an air intake chamber in which said motor and fan are located with the outlet of said fan opening into said vaporizing chamber.

9. The structure defined in claim 3 in which the means for opening and closing the said intake valve is a pivoted float-equipped lever and said cut-out switch is a mercury bulb attached to and carried by said lever.

10. The combination with a space to be humidified, of a water-containing vaporizing chamber having an air intake and an air outlet, the latter of which communicates with the space, a fan operated by an electric motor and arranged to produce a forced circulation of air through said vaporizing chamber and into the space, a water container in said vaporizing chamber, an electrically operated heat-controlling element associated with the water in the chamber to change the temperature thereof, a cut-out switch operated by the float controlled valve operating means, a thermostat subject to temperature of the fluid in said chamber, a humidostat subject to the humidity of the space, a circuit for the heat-controlling means including said cut-off switch and a switch operated by the said thermostat, and a circuit for said blower motor also including said cut-off switch and further including a switch operated by the said humidostat.

11. In a humidifying system, an electric circuit involving a common lead and two shunt leads, a heat controlling element and a switch therefor in one of said shunt leads, a thermostat for opening and closing said heat controlling switch, an electric motor and a motor-controlling switch in the other of said shunt leads, a humidostat with connections for opening and closing said motor controlling switch, a water-containing vaporizing chamber having an air intake and an air outlet, the latter extending to the place or space where said humidostat is located, a fan operated by said electric motor and arranged to produce a forced circulation of air through said vaporizing chamber, said thermostat being so located that it is subject to the temperature of the water in said vaporizing chamber.

ASHER D. ARMSTRONG.